United States Patent
Medina, III

(10) Patent No.: US 9,058,512 B1
(45) Date of Patent: Jun. 16, 2015

(54) SYSTEMS AND METHODS FOR DIGITAL SIGNATURE DETECTION

(75) Inventor: Reynaldo Medina, III, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 1816 days.

(21) Appl. No.: 11/864,569

(22) Filed: Sep. 28, 2007

(51) Int. Cl.
*G06K 9/00* (2006.01)
*G06Q 20/40* (2012.01)

(52) U.S. Cl.
CPC ........ *G06K 9/00161* (2013.01); *G06Q 20/4014* (2013.01)

(58) Field of Classification Search
CPC ............. G06K 9/00161; H04L 9/3247; G06Q 20/4014
USPC ......................................... 382/119, 137–140
See application file for complete search history.

(56) References Cited

U.S. PATENT DOCUMENTS

| | | | | |
|---|---|---|---|---|
| 4,454,610 A * | 6/1984 | Sziklai | | 382/119 |
| 5,475,403 A * | 12/1995 | Havlovick et al. | | 705/33 |
| 5,910,988 A | 6/1999 | Ballard | | 705/75 |
| 6,014,454 A * | 1/2000 | Kunkler | | 382/137 |
| 6,032,137 A | 2/2000 | Ballard | | 705/75 |
| 6,053,405 A * | 4/2000 | Irwin et al. | | 235/375 |
| 6,236,009 B1 * | 5/2001 | Emigh et al. | | 209/584 |
| 6,363,162 B1 * | 3/2002 | Moed et al. | | 382/112 |
| 6,450,403 B1 | 9/2002 | Martens et al. | | 235/379 |
| 2002/0065786 A1 | 5/2002 | Martens et al. | | 705/70 |
| 2003/0133610 A1 * | 7/2003 | Nagarajan et al. | | 382/173 |
| 2005/0035193 A1 * | 2/2005 | Gustin et al. | | 235/379 |
| 2005/0089209 A1 * | 4/2005 | Stefanuk | | 382/137 |
| 2005/0097046 A1 * | 5/2005 | Singfield | | 705/42 |

OTHER PUBLICATIONS

Burnett, J., "Depository Bank Endorsement Requirements," *BankersOnline.com*, http://www.bankersonline.com/cgi-bin/printview/printview.pl, 2003, downloaded Apr. 2, 2007, 3 pages.
Federal Check 21 Act, "New Check 21 Act Effective Oct. 28, 2004: Banks No Longer Will Return Original Cancelled Checks," Consumer Union's FAQ's and Congressional Testimony on Check 21, www.consumerlaw.org/initiatives/content/check21_content.html, downloaded Dec. 2005, 20 pages.
Federal Reserve Board, "Check Clearing for the 21$^{st}$ Century Act," *FRB*, http://www.federalreserve.gov/paymentsystemts/truncation/, 2006, downloaded Apr. 2, 2007, 1 page.

(Continued)

*Primary Examiner* — Kim Vu
*Assistant Examiner* — Michael Vanchy, Jr.
(74) *Attorney, Agent, or Firm* — Brinks Gilson & Lione

(57) ABSTRACT

A system, method and computer-readable medium are provided to enable digital bank endorsement. A digital image of a back side of a check may be placed in a computer memory. Appropriate coordinates for a bank endorsement may be determined. A bank endorsement may be automatically generated. The digital image may then be electronically altered by overlaying, merging, or rendering text of the generated bank endorsement. A modified digital image may be combined with an image of the front side of the check and stored and/or exported to check clearing operations.

21 Claims, 8 Drawing Sheets

(56) References Cited

OTHER PUBLICATIONS

Masonson, L., "Check truncation and ACH trends—automated clearing houses," *Healthcare Financial Management Association*, http://www.findarticles,com/p/articles/mi_m3276/is_n7_v47/ai_1466035/print, 1993, downloaded Apr. 2, 2007, 2 pages.

RemoteDepositCapture.com, LLC, "Remote Deposit Capture Overview," *RDC Overview*, http://remotedepositcapture.com/Overview/RDC_Overview.htm, 2006, downloaded Apr. 2, 2007, 4 pages.

Zhang, C.Y., "Robust Estimation and Image Combining," *Astronomical Data Analysis Software and Systems IV, ASP Conference Series*, 1995, 77, 5 pages.

\* cited by examiner

SYSTEMS AND METHODS FOR DIGITAL SIGNATURE DETECTION

CROSS-REFERENCE TO RELATED APPLICATIONS

This application is related by subject matter to U.S. patent application Ser. No. 11/864,602 and U.S. patent application Ser. No. 11/864,626, both filed on even date herewith.

BACKGROUND

Check usage has undergone global decline as a result of faster, cheaper, and more secure electronic payment systems. Checks have not disappeared entirely however. In several major economies including the United States, checks remain widely used. The Check Clearing for the $21^{st}$ Century Act ("Check 21") was enacted by the United States federal government on Oct. 28, 2003 and took effect exactly one year later. The law allows a recipient of a check to create a digital version, thereby eliminating any need for further handling of the physical document.

A check made and cleared in the United States typically follows the following cycle: the maker of the check first writes the check, signs the front of the check, and gives it to the payee. The payee then endorses the check by signing the back side of the check, and gives the check to a receiving bank, e.g. a bank at which the payee may have a deposit account. The receiving bank stamps the check on the back side with a bank endorsement, and presents the check to the drawee. The drawee is a financial institution at which the maker holds an account, and the drawee is therefore legally obliged to honor the check.

The portion of the above described cycle occurring after receipt of the check by the receiving bank is referred to herein as clearing the check. After Check 21, the receiving bank may convert the front and back sides of the check into digital images. The images thus acquired may be presented to the drawee instead of the physical check.

Because check processing has become increasingly mechanized, and to further reduce check processing costs and improve check clearing speed under Check 21, there is a need in the industry to provide effective technologies for digital signature detection on checks.

SUMMARY

The described embodiments contemplate systems, methods and computer-readable media with computer-executable instructions for digital signature detection on checks. In one embodiment, a method for detecting a signature on a check is contemplated. The method includes loading a check image into a computer memory, then determining a signature window location on the check image. A process counts a number of pixels in the signature window to acquire a signature window pixel count. The signature window pixel count can then be compared to a minimum pixel threshold and a maximum pixel threshold. If the count is below the minimum threshold, the presence of a signature is unlikely. Similarly, if the count is above the maximum threshold, the presence of a signature is unlikely. Additional comparisons and analysis may be performed in some embodiments. Finally, a detection flag may be set to true when the signature window pixel count is, for example, greater than the minimum pixel threshold and less than the maximum pixel threshold.

In another exemplary embodiment, a method for detecting a signature on a check comprises determining whether a check image is a business check image or a personal check image, using common characteristics that can be used to distinguish such images. When the check is a business check, a business check signature detection process is applied. Alternatively, when the check is a personal check, a personal check signature detection process is applied.

In a third exemplary embodiment, a method for detecting a signature on a check comprises loading a check image and determining signature window locations for a first signature window on a first end of said check image, and for a second signature window on a second end of said check image, said second end being opposite from said first end. The method may next count a number of pixels in said first and second signature windows to acquire first and second signature window pixel counts. The first signature window pixel count can be compared to said second signature window count, and a detection flag may be set to true when the first signature window pixel count differs from said second signature window pixel count.

Additional advantages and features of the invention are described below.

BRIEF DESCRIPTION OF THE DRAWINGS

The foregoing summary, as well as the following detailed description of preferred embodiments, is better understood when read in conjunction with the appended drawings. Exemplary embodiments are provided for the purposes of illustration; however the embodiments are not limited to the specific methods and instrumentalities disclosed. In the drawings.

DETAILED DESCRIPTION

Certain specific details are set forth in the following description and figures to provide a thorough understanding of various embodiments. Certain well-known details often associated with computing and software technology are not set forth in the following disclosure, however, to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of embodiments, and the steps and sequences of steps should not be taken as required to practice this invention.

Figure 1:
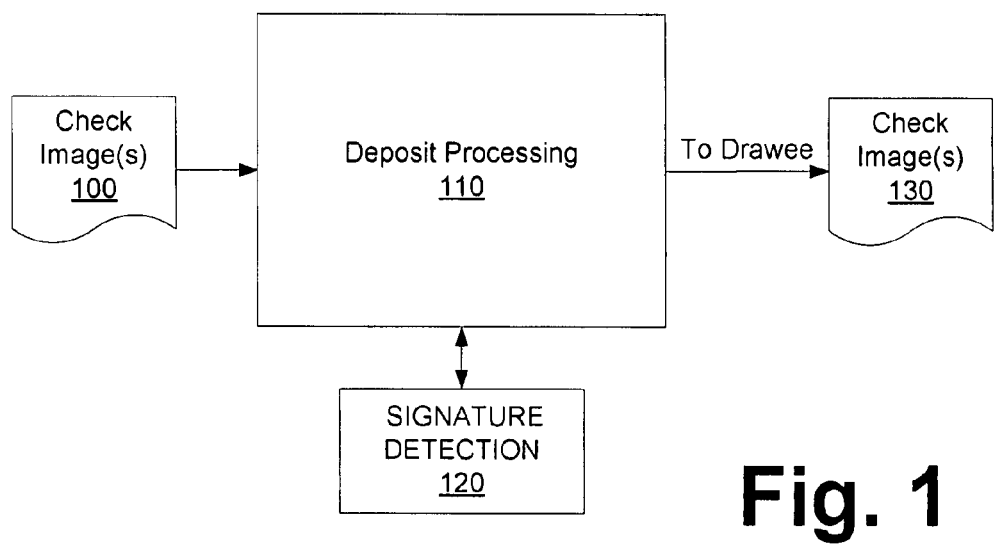
FIG. 1 illustrates a schematic diagram showing a signature detection process.

FIG. 1 is a schematic diagram showing a signature detection process 120 in an exemplary context of processing a check deposit. While the illustrated context is a likely context for exemplary embodiments, it is also possible that the systems and methods disclosed will be applied in other contexts.

In the exemplary context illustrated in FIG. 1, check image(s) 100 are loaded into deposit processing 110 at a receiving bank. As part of deposit processing 110, signature detection 120 can be called. Signature detection 120 may, for example, detect the presence of an endorsement signature on an image of a back side of a check. A notification can be provided by signature detection 120 to deposit processing 110, indicating an endorsement signature is detected or not detected. Similarly, signature detection 120 may be configured to scan for a payor signature on an image of a front side of a check, and notify deposit processing 110 of the presence or absence of such signature.

Deposit processing 110 may proceed according to information received from signature detection 120. For example, in one embodiment, deposit processing 110 may abort a deposit transaction if signature detection 120 indicates no endorsement and/or payor signature, or may proceed with a deposit transaction if signature detection 120 indicates the presence of such signatures. However, this result is not required in all embodiments. For example, in certain scenarios it may be beneficial for deposit processing 110 to proceed with a transaction even if signature detection 120 does not detect an endorsement signature. Instead of aborting a transaction, the transaction may be flagged for later analysis, or may be otherwise handled in a more secure mode.

If deposit processing 110 proceeds with a transaction, check images 130, which may be the same as images 100 or a modified version of images 100, may be, for example, sent to a drawee bank in a check clearing operation pursuant to Check 21. It is also possible that deposit processing 110 and signature detection 120 are performed upon receipt of images 100 by a drawee bank, in which case the end result may be transferring funds to the receiving bank instead of sending images to a drawee.

Figure 2:
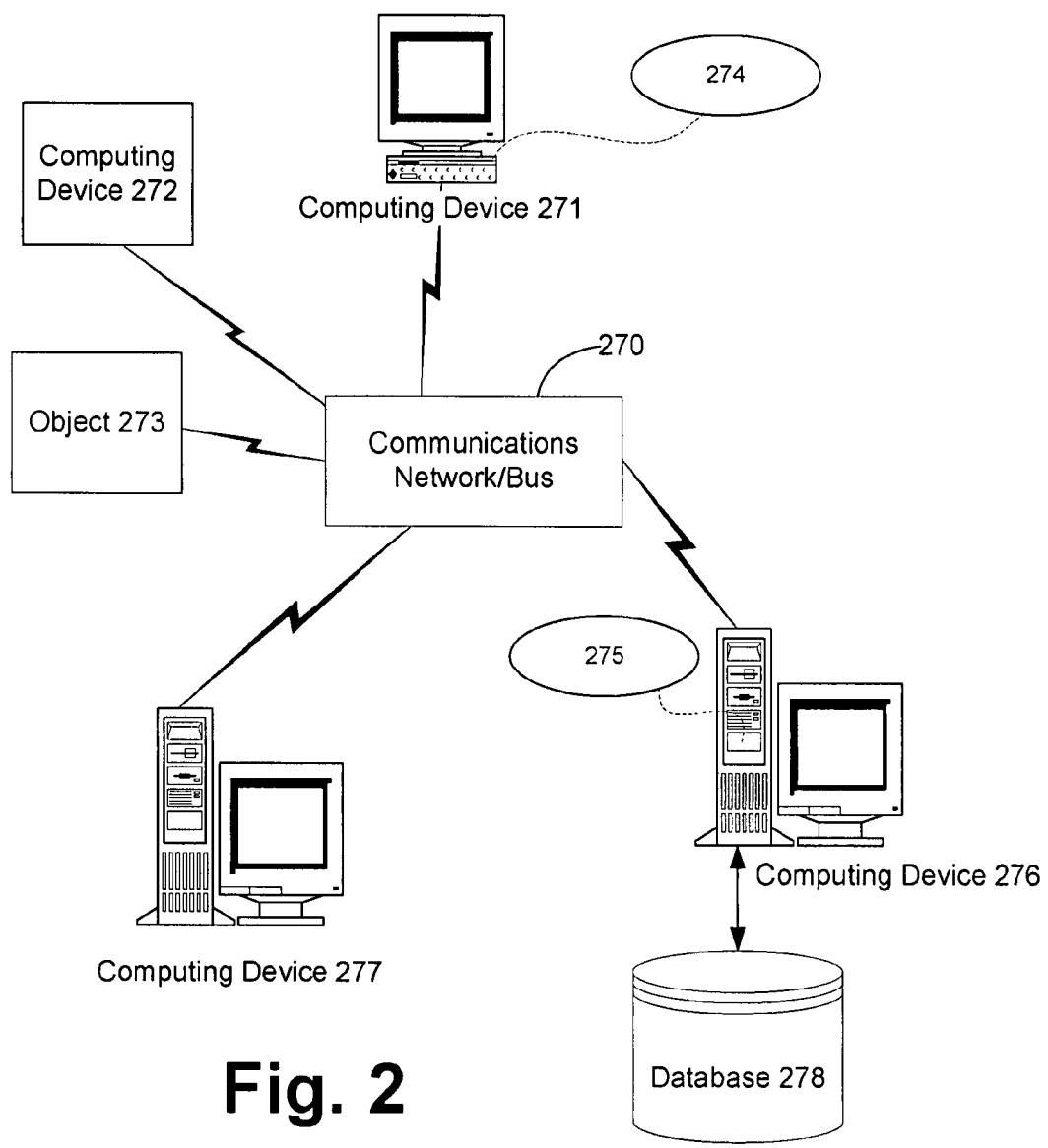
FIG. 2 illustrates an exemplary networked computer system as may implement certain aspects of check signature detection as disclosed herein.
Figure 3:
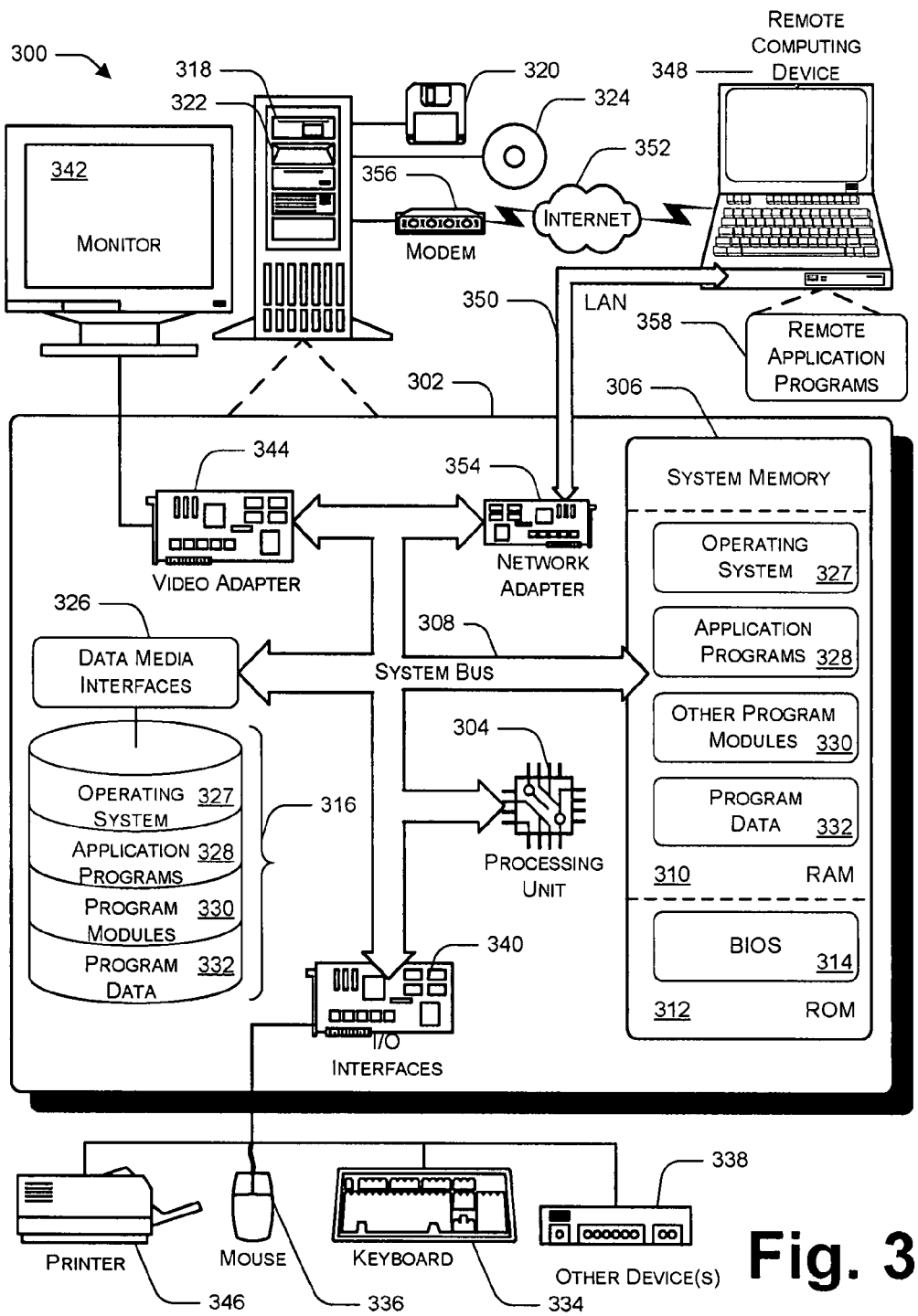
FIG. 3 illustrates an exemplary computer as may be connected to a network such as that of FIG. 2.
Figure 7:
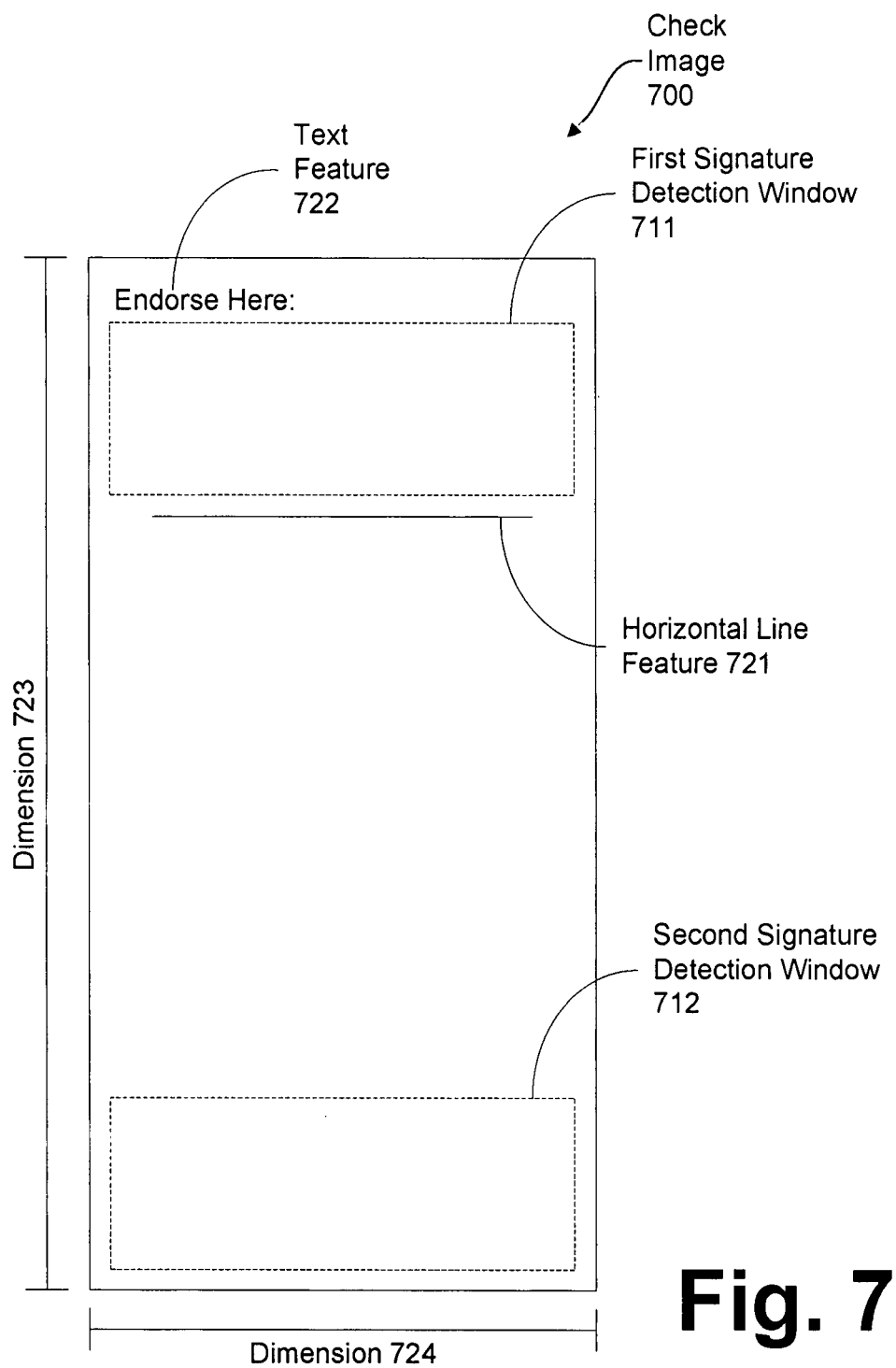
FIG. 7 illustrates an exemplary check image.
Figure 8:
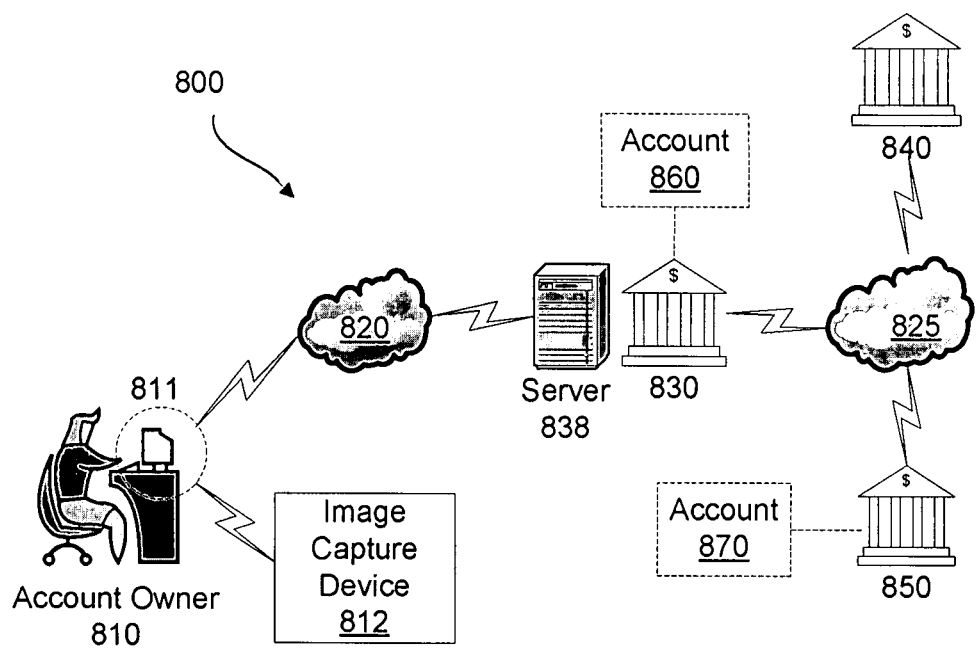
FIG. 8 illustrates a schematic diagram for a deposit at home transaction.

Exemplary aspects of signature detection 120 are elaborated further below with reference to FIGS. 4-7. FIGS. 2 and 3 provide an exemplary network and computing device which may be configured to implement aspects of the embodiments, and FIG. 8 illustrates systems and methods for supporting an exemplary deposit at home transaction which may be utilized in connection with the signature detection technologies disclosed herein.

Referring now to FIG. 2, an exemplary networked computing environment is provided as may be used in connection with various embodiments. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

Network 270 may itself comprise other computing entities that provide services to the system of FIG. 2, and may itself represent multiple interconnected networks. Each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as a hostname which resolves to a Internet Protocol (IP) address can be used to identify the server or client computers to each other. A network address is also sometimes referred to as a URL address. Communication can be provided over a communications medium, e.g., client(s) and server(s) may be coupled to one another via TCP/IP connection(s) for high-capacity communication.

An exemplary general purpose computer as may be utilized in conjunction with embodiments is illustrated in FIG. 3. Device electronics 300 are illustrated in FIG. 3, and a schematic blowup 302 is provided to illustrate an exemplary internal architecture of the device. Computing architecture 302 includes one or more processors or processing units 304, a system memory 306, and a bus 308 that couples various system components including the system memory 306 to processors 304.

The bus 308 represents one or more of any of several types of bus structures, including a memory bus or memory controller, a peripheral bus, an accelerated graphics port, and a processor or local bus using any of a variety of bus architectures. The system memory 306 includes read only memory (ROM) 312 and random access memory (RAM) 310. A basic input/output system (BIOS) 314, containing the basic routines that help to transfer information between elements within computing device 300, such as during start-up, is stored in ROM 312.

Computing architecture 302 further includes persistent memory such as a hard disk drive 326, and may include a magnetic disk drive 318 for reading from and writing to a removable magnetic disk 320, and an optical disk drive 322 for reading from or writing to a removable optical disk 324 such as a CD ROM or other optical media. The hard disk drive 326, magnetic disk drive 318, and optical disk drive 324 are connected to the bus 308 by appropriate interfaces. The drives and their associated computer-readable media provide non-volatile storage of computer-readable instructions, data structures, program modules and other data for computing device 300. Although the exemplary environment described herein employs a hard disk, a removable magnetic disk 318 and a removable optical disk 324, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 326, magnetic disk 318, optical disk 324, ROM 312, or RAM 310, including an operating system 327, one or more application programs 328, other program modules 330, and program data 332. Such program modules combined with computer 300 electronics are referred to herein as "components" and/or "subsystems" of the system illustrated in FIG. 3, because when combined in this way computer hardware and program module become an integrated physical system designed to carry out the purpose of the program module.

A user may enter commands and information into computing device 300 through input devices such as a keyboard 334 and a pointing device 336. An image capture device 346 may also be coupled to the general purpose computer 300 as an input device. Other input devices 338 may include a microphone, joystick, game pad, satellite dish, or the like. These and other input devices are connected to the processing unit 304 through interfaces 340 that are coupled to the bus 308. A monitor 342 or other type of display device is also connected to the bus 308 via an interface 324, such as a video adapter 324.

Generally, the data processors of computing device 300 are programmed by means of instructions stored at different times in the various computer-readable storage media of the computer. Programs and operating systems may be distributed, for example, on floppy disks, CD-ROMs, or electronically, and are installed or loaded into the secondary memory of a computer. At execution, the programs are loaded at least partially into the computer's primary electronic memory 306.

Computing device 300 may operate in a networked environment using logical connections to one or more remote computers 348, such as one or more server computers, routers, network PCs, and so forth, which typically include many or all of the elements described above relative to computing device 300. The remote computer 348 may run remote application programs 358 which may operate in concert with application programs 328 that execute on the computer 300. For example, a software component may, in one embodiment, execute pursuant to commands from a remote application program 358. The software component may of course also operate in a more autonomous manner, performing certain tasks and then communicated data as necessary back to the remote application programs 358.

When used in a LAN networking environment, a computer 300 is connected to a local network 350 through a network interface or adapter 354. When used in a WAN networking environment, computing device 300 typically includes a modem 356 or other means for establishing communications over the wide area network 352, such as the Internet. The modem 356, which may be internal or external, can be connected to the bus 308 for example via a serial port interface, or by sending a signal to a wireless router which then broadcasts and receives wireless signals to and from a wireless card that is connected to the computer 300.

In a networked environment, program modules depicted relative to the computing device 300, or portions thereof, may be stored in the remote memory storage device. It will be appreciated that the network connections shown are exemplary and other means of establishing a communications link between the computers may be used.

Figure 4:
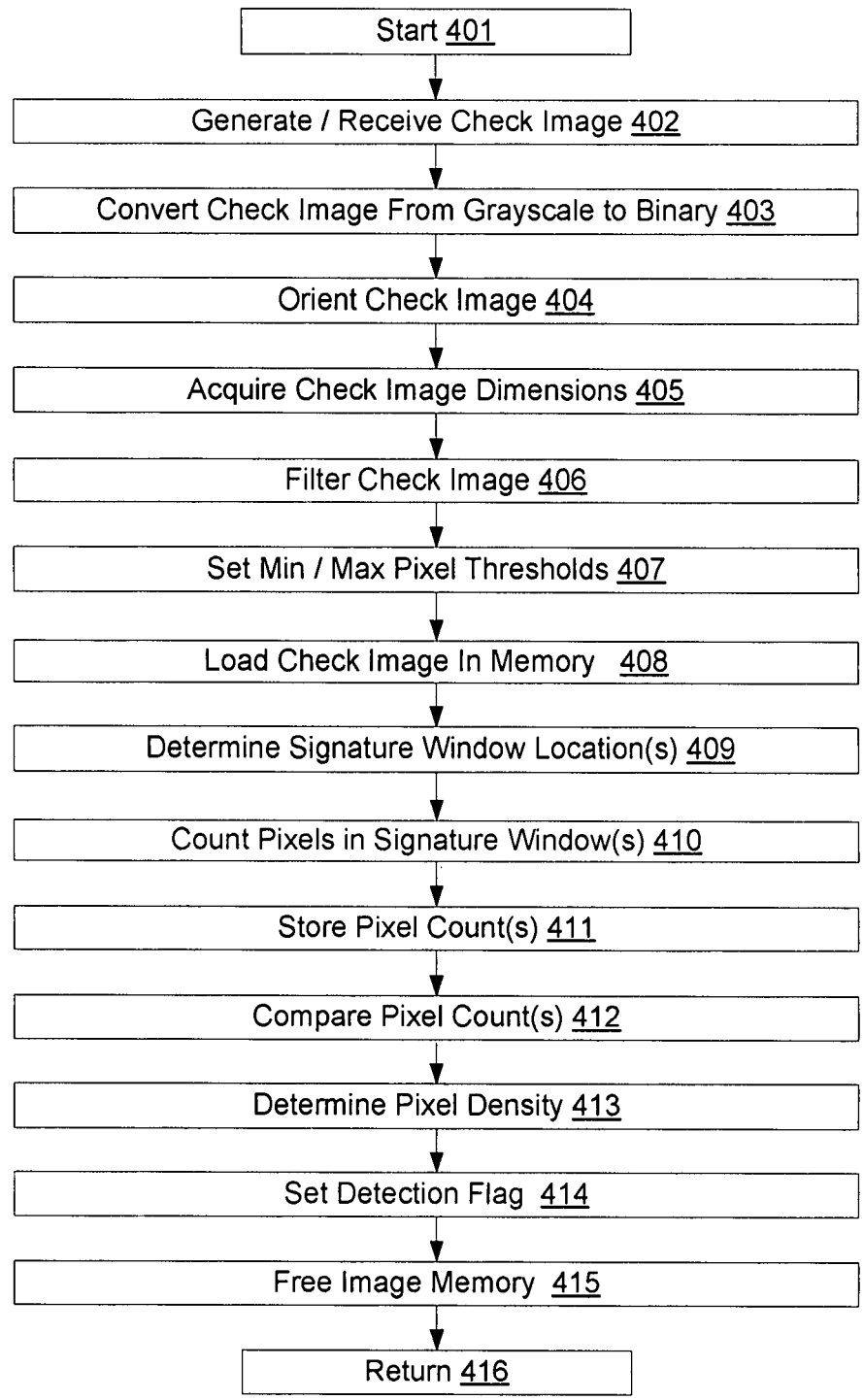
FIG. 4 illustrates an exemplary method, system, and computer readable media comprising steps and/or subsystems and instructions as may be implemented in a signature detection process.

Referring now to FIG. 4, a flowchart is illustrated comprising elements that correspond to steps of a method, components and/or subsystems included in a computer system, or instructions stored on a computer readable medium, depending on the precise embodiment. For simplicity, FIG. 4 will be generally discussed as a method.

Figure 5:
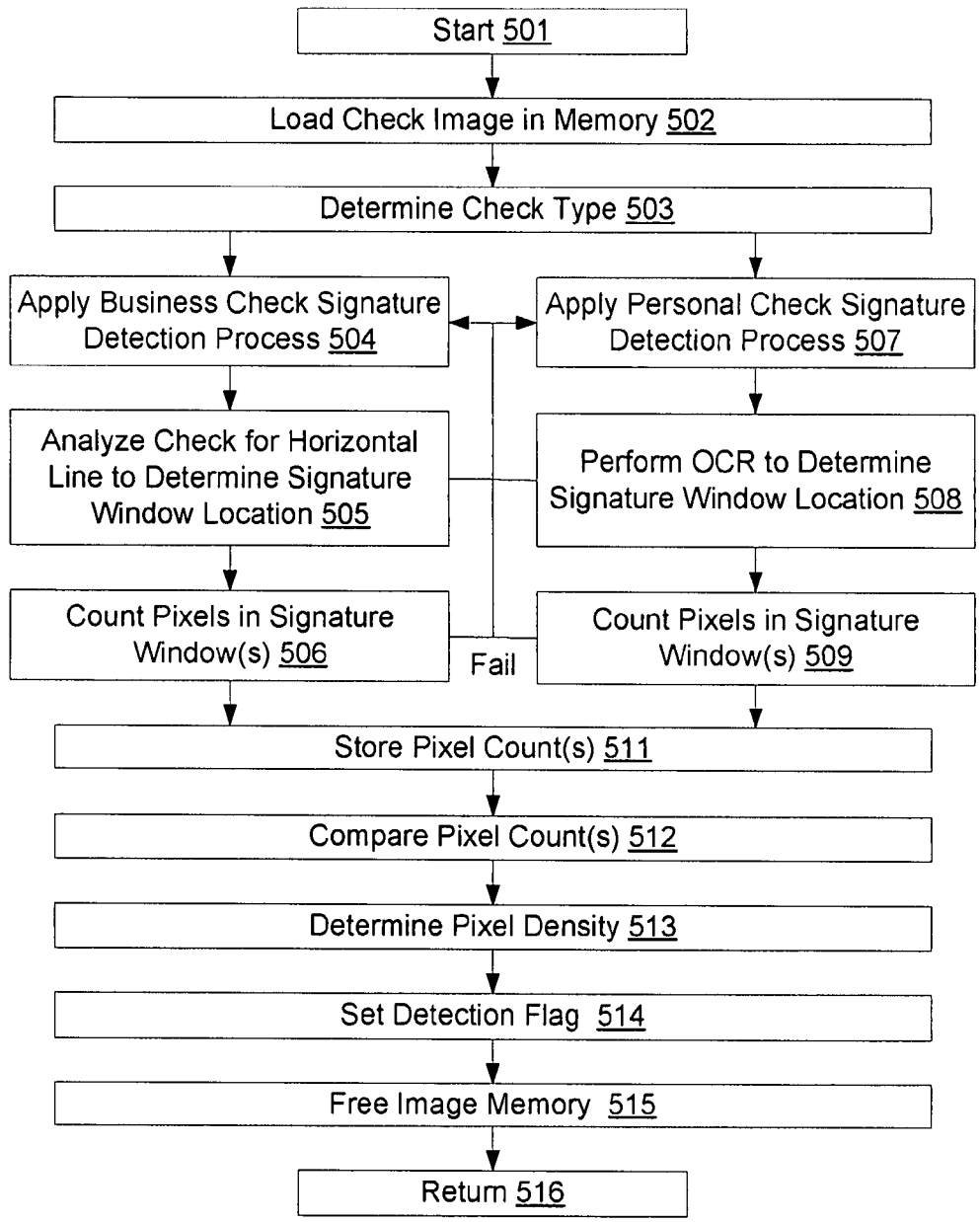
FIG. 5 illustrates steps and/or subsystems and instructions as may be implemented in addition to those illustrated in FIGS. 4 and 6.
Figure 6:
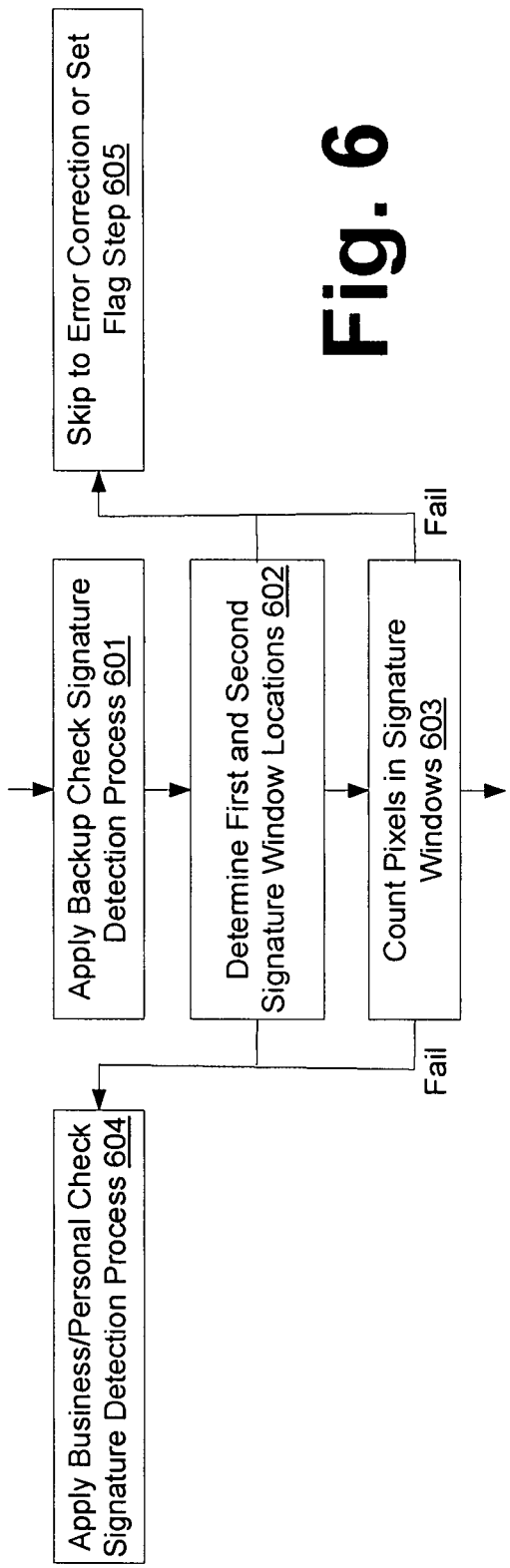
FIG. 6 illustrates steps and/or subsystems and instructions as may be implemented in addition those illustrated in FIGS. 4 and 5.

FIGS. 4-6 comprise a variety of steps, not all of which are required in particular embodiments. Instead, the steps of FIG. 4 include a variety of steps that may be combined in different ways so as to satisfy the requirements of particular scenarios.

In general, FIGS. 4, 5, and 6 contemplate the use of a plurality of approaches for detecting the presence of a signature on a check. If a first approach fails, a next approach may be attempted, then a third approach, and so on. Attempting multiple approaches upon failure is preferred (though not required) in processing check deposits, because failing a deposit transaction frustrates the customer and necessitates additional processing by the financial institution. The various exemplary methods for signature detection are discussed below, after the following brief discussion of preliminary processing steps 401-407 as may be carried out in some embodiments.

Steps 401-407 may be incorporated into signature detection process 120 in FIG. 1, and may be carried out as part of deposit processing 110. The process starts 401, and check image(s) 100 are received and/or generated 402. Check image(s) may include a single image of a front and back of a check, separate images for the front and back, and/or simply an image of the front alone or the back alone. In one exemplary embodiment, such images may be received in a deposit at home transaction as described below. In another exemplary embodiment, such images may be generated for example by scanning a front and back of a check.

Check image(s) may be converted from a first format to another, e.g., from grayscale to binary format 403. In one embodiment, check image(s) are converted from a Joint Photographic Experts Group (JPEG) format to a Tag Image File Format (TIFF).

Check images may be oriented 404. Orienting a check comprises determining certain check image features, e.g., width and height, then rotating the check image to a desired orientation. For example, if a horizontal orientation is desired, then the check can be oriented so that the longest dimension of the check is horizontal. If a vertical orientation is desired, the check can be oriented so that the longest dimension of the check is vertical.

Check image dimensions may be acquired 405, along with other features of a check image as desired. For example, checks often comprise certain standardized dimensions. Business checks are typically a standard size that is somewhat larger in width and height than the standard size for personal checks. By acquiring check image dimensions, information can be ascertained regarding sizing and location of signature detection window(s). Signature detection window(s) are region(s) of interest (ROI) in counting pixels on the check image. FIG. 7 illustrates an exemplary check image 700 comprising dimensions 723 and 724, as well as other features 721 and 722 as may be used in positioning signature detection windows 711 and 712, discussed in greater detail below.

A check image may be filtered 406. For example, if the check image(s) are dark, a filter can be applied to lighten the image. The opposite may also be performed.

Minimum and maximum pixel count thresholds may be set. These thresholds may be set globally for all checks, or semi-globally for all checks of a certain type, e.g., business versus personal. These thresholds may also be set dynamically on a check-by check basis. Pixel count thresholds define thresholds for number of dark pixels in a signature detection window. In general, when a signature is present, the signature detection window may comprise some number of dark pixels that is within a determinable range. The minimum and maximum pixel count thresholds define the outer limits of this range.

In one embodiment, minimum and maximum pixel count thresholds are set based on experimental data acquired from a particular signature detection system. These thresholds are then applied to all checks processed by the particular system. One exemplary system utilizes the following thresholds:

| Check Type | Min Pixel Threshold | Max Pixel Threshold |
|---|---|---|
| Personal Check | 1000 | 50000 |
| Business Check | 2000 | 50000 |
| Machine Printed Business Check | 3000 | 50000 |

In another embodiment, the thresholds can be set dynamically, for example by sampling areas of a check image, then finding a sample with a highest pixel count and a sample with a lowest pixel count. An average pixel count across the samples may also be calculated. These three values—high, low, and average, may be utilized in one exemplary embodiment to determine appropriate thresholds. For example, a value between the low value and average value may be selected as a minimum pixel count threshold and a value between the high value and average value may be selected as a maximum pixel count threshold.

Steps 408-416 represent any of a plurality of approaches as may be used to detect the presence of a signature. In general these methods may comprise loading a check image into memory 408, determining a signature window location 409, counting pixels in the signature window 410, storing the pixel count 411, comparing the pixel count 412 to either another pixel count from another signature detection window, or to the pixel count thresholds, determining pixel density 413 as an optional error correction and accuracy measure, setting a detection flag 414, freeing image memory 415, and returning the value of the detection flag 416, e.g., to the deposit processing 110 in FIG. 1.

In a first embodiment, determining a signature window location 409 can be accomplished by using Optical Character Recognition (OCR) to identify a check feature, and to choose a signature window location based on the location of said check feature. For example, referring to FIG. 7, OCR can be applied to locate the text feature 722 by looking for all or a portion of the word "endorse." Once found, the signature detection window 711 location can be determined by placing the window beneath the text feature 722 as illustrated.

In another embodiment, determining a signature window location 409 can be accomplished by analyzing the check image to detect a graphical check feature, and to choose a signature window location based on the location of the graphical check feature. For example, referring to FIG. 7, image analysis can be applied to locate the horizontal line feature 721 by looking for horizontal lines spanning a substantial portion of the dimension of the check as illustrated. Once a horizontal line is found, the signature detection window 711 location can be determined by placing the window above the horizontal line feature 721 as illustrated.

In another embodiment, determining a signature window location 409 can be accomplished by analyzing the check image to detect a graphical check feature, and to choose a signature window location based on the location of the graphical check feature. For example, referring to FIG. 7, image analysis can be applied to locate the horizontal line feature 721 by looking for horizontal lines spanning a substantial portion of the dimension of the check as illustrated. Once a horizontal line is found, the signature detection window 711 location can be determined by placing the window above the horizontal line feature 721 as illustrated.

The above embodiments may be combined for example as illustrated in FIG. 5. Referring to FIG. 5, it can be determined after steps 501 and 502 whether a check image is a business check image or a personal check image 503. This determination can be made for example using gathered information about the check, e.g. check dimension information. In one embodiment, for example, a height dimension greater than 16 centimeters, or 1264 pixels, indicates a business check, while smaller checks are usually personal checks. The presence or absence of a horizontal line 721 as illustrated in FIG. 7 may also be used.

In one exemplary embodiment, a further distinction may be made between machine printed business checks and ordinary business checks. This distinction may be made in the same way, based on gathered information about the check. For example, depending on check image orientation, a vertical or horizontal line count greater than four is a feature frequently observed on only machine printed business checks, and not ordinary business checks as will be appreciated by those of skill in the check printing and identification industry.

When it is determined that an image is a business check image, a business check signature detection process 504 may be applied. For example, the business check signature detection process 504 may comprise steps 505 and 506, involving detecting a horizontal line 505 to determine a signature window location as described above, then counting pixels in the signature window 506, as well as remaining steps 511-516 which correspond to steps 411-416.

When it is determined that an image is a personal check image, a personal check signature detection process 507 may be applied. For example, the personal check signature detection process 504 may comprise steps 505 and 506, involving performing OCR 508 to determine a signature window location as described above, then counting pixels in the signature window 509, as well as remaining steps 511-516 which correspond to steps 411-416.

Furthermore, the if the business check signature detection process 504 is performed and fails, i.e., does not detect the presence of a signature, then another method such as that utilized in the personal check signature detection process 507 may be applied, and vice versa. If both methods fail, then yet another method, for example the method illustrated in FIG. 6 and/or a method that utilizes entropy thresholds instead of pixel count thresholds. In an exemplary method utilizing entropy thresholds, when entropy a signature window is above a certain value, then it may be surmised that a signature is present, because this indicates the pixels are more ordered than they are randomly distributed. Conversely, when entropy is low, the is less likely to be a signature, because pixels are distributed throughout the signature detection window without being condensed in certain areas, e.g., corresponding to the handwritten lines of a signature. This method can be used in conjunction with the various other approaches described herein.

Referring back to FIG. 4, in another embodiment, determining a signature window location 409 can be accomplished as illustrated in FIG. 6. Also, the embodiment illustrated in FIG. 6 may be utilized as the business check signature detection process or as the personal check signature detection process of FIG. 5, by replacing for example steps 504, 505, and 506 or steps 507, 508, and 509 with steps 601, 602, and 603.

In the embodiment of FIG. 6, determining signature window locations can be accomplished by determining a first and second signature window locations 602. For example, as illustrated in FIG. 7, a first signature window 711 can be placed on one end of a check image 700, as shown, and a second signature window 712 can be placed on an opposite end of check image 700. The locations of the windows 711 and 712 can thus be determined from the dimensions 723, and 724 of the check image 700. The pixels in both the first and second signature windows may be counted 603. Later, when comparing pixel counts as illustrated in step 412 of FIG. 4, instead of comparing a pixel count to threshold information as with the other described embodiments, the pixel counts from the first and second pixel windows may be compared to each other. If there is a sufficient difference in the pixel counts, e.g., as determined from experimental data for a particular system, then the presence of a signature may be presumed.

Also, as with the processes illustrated in FIG. 5, the embodiment of FIG. 6 may deploy another method of signature detection upon failure, in exemplary step 604, or may skip 605 to error correction such as step 413 in FIG. 4, or set flag steps as in 414 of FIG. 4.

Returning to FIG. 4, step 413 contemplates determining pixel density as one mode for establishing a potential reason for failure and/or establishing a confidence level in a signature detection result. High pixel density generally correlates to the counted pixels being clustered together, while low pixel density correlates to pixels being spread apart. A signature will have a higher pixel density than background "noise" that spreads black pixels across an entire signature detection window, but lower pixel density than, for example, an image of a large black ink blot. Threshold density levels can be determined through experimentation for particular systems and can be applied as needed.

The following pseudo code illustrates exemplary method steps, instructions on computer readable media, and/or computer subsystem components as may be utilized in one embodiment. The following parameters are utilized in this pseudo code:

strImage identifies a check image file. For example: "C:\\my_check_back.tif"

pixel_count is a placeholder for a pixel count.

detection_flag is a placeholder for an integer set or reset upon completion of a signature detection process. For example, if the flag is 1, then a signature was detected. If the flag is 0, then the signature was not detected.

image_analysis identifies is a folder containing an image analysis program used in supporting aspects of the invention requiring image analysis.

The following pseudo code may be utilized:

```
long DetectEndorsment(char * strImage, int * pixel_count, int * detection_flag, char * image_analysis)
{
    Set minimum pixel threshold.
    Set the maximum pixel threshold.
    Load check image from the file path pointed by strImage.
    Set virtual image resolution to 200 dpi.
    Make the virtual horizontal image vertical in memory.
//1. Detection by means of character recognition//
    Save the Image.
    ReadEndorseWord(strImage, EndorseResult, image_analysis);
    Set the minimal amount of correct letters of the word "ENDORSE"
    If(EndorseResult is not empty)
    {
        Count the number of (non repeating) letters returned from the OCR function ReadEndorseWord.
        If(the minimum amount of letters of the word "Endorse" is reached)
        {
            Rotate Virtual Image Right 90 degrees in memory to make horizontal.
            Count the number of pixels in the signature detection window.
            {
```

```
            If(the image is a personal check)
            {
              If(pixel count is greater than personal check minimum pixel threshold
              and less than personal check maximum pixel threshold)
                {
                  Assign detection_flag to true.
                  Assign the pixel count read for the signature to pixel_count.
                  Free Image memory
                  Return appropriately
                }
            }
//2. Detection using horizontal lines//
    If(A business check)
        {
          Retrieve horizontal lines.
          If (target line found)
            {
              Rotate appropriately.
              Count pixels in signature detection window.
              Free memory.
              De-initialize API by terminating Instance ID.
              Return appropriately.
            }
        }
//3. Detection by comparing opposite sides//
    If(the image is a business check)
        {
          If (left side signature window pixel count and right count are below the business
          minimum pixel threshold)
            {
              Then there is no signature
              Free memory
              Return Appropriately
            }
          If(left side signature window pixel count is greater than the right count and above the
          business minimum pixel threshold and the right count is below the business
          minimum pixel threshold)
            {
              The signature was detected on the left side
              Free memory
              Return appropriately.
            }
          If(right side signature window pixel count is greater than the left count and the right
          count is above the business minimum pixel threshold and the left count is below the
          business minimum pixel threshold)
            {
              The signature is on the right side
              Free memory
              Return appropriately.
            }
        }
//4. General detection for Personal Checks//
    If(a personal check)
        {
          If(left side signature window pixel count is greater than the right count and greater
          than the personal check minimum pixel threshold and the right count is less than the
          personal check minimum pixel threshold)
            {
              Signature is on the left side
              Free memory
              Return Appropriately
            }
          If(right side signature window pixel count is greater than the left count and greater
          than the personal check minimum pixel threshold and the left count is below the
          personal check minimum pixel threshold)
            {
              Signature in on the right side
              Free memory
              Return Appropriately
            }
          If(both the left and the right side signature window pixel counts are greater than the
          personal check minimum pixel threshold)
            {
              Filter the image.
              Count the left and right signature area.
              If(left side signature window pixel count is greater than the right count and
              greater than the personal check minimum threshold)
                {
                  The signature is on the left side
```

```
        Free Memory.
        Return Appropriately.
      }
      If(right side signature window pixel count is greater than the left count and
      greater than the personal check minimum pixel threshold)
      {
        The Signature is on the right side
        Free Memory
        Return Appropriately
      }
      If(left side signature window pixel count is greater than the right count and
      greater then the personal check minimum pixel threshold and the right count
      is less than the personal check minimum pixel threshold)
      {
        Signature is on the left side
        Free Memory
        Return Appropriately
      }
      If(right side signature window pixel count is greater than the left count and
      greater than the personal check minimum pixel threshold and the right count
      is less than the personal check minimum pixel threshold)
      {
        Signature is on the right side.
        Free Memory
        Return Appropriately
      }
    }
  }
//5. Default//
  Unable to detect
  Free Memory
  Return Appropriately
}
```

The embodiments may be implemented in the context of a deposit at home transaction. Exemplary deposit at home technologies are described, for example, in U.S. patent application Ser. Nos. 11/321,025 and 11/591,014. Future systems may emerge allowing individuals to remotely deposit checks using, for example, a customer controlled home telephone or customer controlled general purpose consumer. Such remote deposit systems may prove advantageous for banks and bank customers alike, in part because they are adapted for today's mobile lifestyles experienced at least by individuals in military, government, and private sector careers, and in part because they successfully leverage electronic communications advances allowing unprecedented automation, speed, and security in deposit transactions.

FIG. 8 is generally directed to a variety of aspects of a system for processing remote deposit of checks as contemplated for use in connection with various embodiments. FIG. 8 illustrates an example system in which the described embodiments may be employed. System 800 may include account owner 810, e.g., a bank customer who may be located, for example, at the customer's private residence. The account owner 810 may be utilizing a customer-controlled, general purpose computer 811. A general purpose computer 811 is generally a Personal Computer (PC) running one of the well-known WINDOWS® brand operating systems made by MICROSOFT® Corp., or a MACINTOSH® (Mac) brand computer, running any of the APPLE® operating systems. General purpose computers are ubiquitous today and the term should be well understood. A general purpose computer 811 may be in a desktop or laptop configuration, and generally has the ability to run any number of applications that are written for and compatible with the computer's operating system. A particular advantage of a system as illustrated in FIG. 8 is its ability to operate in conjunction with electronics that today's consumers actually use, such as a general purpose computer, a scanner, and a digital camera.

General purpose computer 811 may also be "customer-controlled." A common example of a customer-controlled computer would be a typical computer located in a private residence. The owner of such a computer typically has the power to install programs and configure the computer as they wish, subject to certain security restrictions that may be imposed by the hardware or software manufacturers. A customer-controlled computer need not be located in a private residence, however. For example, computers in college dormitories, in workplace offices, and so forth may also be considered to be "customer-controlled."

One of the applications that may run on a general purpose computer 811 is a browser. Common browsers in use today are, for example, the INTERNET EXPLORER® made by MICROSOFT® Corp., the FIREFOX® browsers distributed via the MOZILLA® open source project, and the NETSCAPE NAVIGATOR® browsers also distributed via the MOZILLA® open source project. Browsers generally allow users to point to a Uniform Resource Locator (URL), and thereby retrieve information such as a web page. For example, a browser application on computer 811 could retrieve a web page that is kept at server 831, and display the web page to the account owner 810, as is generally known and appreciated in the industry and by the general public.

Another application, or set of applications, that may run on a general purpose computer 811 comprises "virtual machine" technologies such as the JAVA® virtual machine software distributed by SUN MICROSYSTEMS® Corp, and .NET® Framework distributed by MICROSOFT® Corp. In general, such applications facilitate execution of computer programs in a variety of computing environments. For example, a JAVA® applet is a computer program (which may be alternatively referred to herein as a "software component") that can execute on any computer running the JAVA® virtual machine software. The applet may be provided to virtual machine software in a "source code" format, and may be compiled by a "just in time" compiler, so as to put the applet in a form that can be executed by the hardware associated with the particular computing device. These technologies are known in the art and may be utilized in connection with a system as illustrated in FIG. 8.

An image capture device 812 may be communicatively coupled to the computer 812. Image capture device may be, for example, a scanner or digital camera. Computer 811 may comprise software that allows the user to control certain operations of the image capture device 812 from the computer 811. For example, modern scanner users may be familiar with the TWAIN software often used to control image capture from a computer 811. Similarly, digital cameras often use software that allows users to move images from the camera to a computer 811, and may also provide additional functions, such as photo editing functions including crop and rotate.

Financial institutions 830, 840 and 850 may be any type of entity capable of processing a transaction involving a negotiable instrument. For example, financial institutions 830, 840 and 850 may be a retail bank, investment bank, investment company, regional branch of the Federal Reserve, clearinghouse bank and/or correspondent bank. A negotiable instrument is usually a type of contract that obligates one party to pay a specified sum of money to another party. By way of example, and not limitation, negotiable instruments may include a check, draft, bill of exchange, promissory note, and the like.

Financial institution 830 is illustrated as associated with a server 838. Financial institution 830 may maintain and operate server 838 for the purposes of communicating with customers such as 810. Alternatively, such server may be maintained and operated by one or more third party vendors who act under the instructions of the financial institution 830, but possess skills and resources that may be more effective in competent operation of electronics. Such arrangements are well known in the industry and in this case the server 838 is nonetheless considered to be "associated" with the financial institution 830.

Account owner 810 may be an individual who owns account 860, which may be held at financial institution 830. As such, account owner 810 may be described as a customer of financial institution 830. Account 860 may be any type of account for depositing funds, such as a savings account, checking account, brokerage account, and the like. Account owner 810 may communicate with financial institution 830 by way of communication network 820, which may include an intranet, the Internet, a local area network (LAN), a wide area network (WAN), a public switched telephone network (PSTN), a cellular network, a voice over internet protocol (VoIP) network, and the like. Account owner 810 may communicate with financial institution 830 by phone, email, instant messaging, facsimile, and the like.

In one contemplated embodiment, network 820 is a publicly accessible network such as the Internet, which can presently be accessed from many private residences and many public places such as college campuses, airports, coffee shops, and restaurants throughout the United States as well as many other countries of the world. A variety of technologies are available to establish secure connections over such a public network, so that data transmitted between computer 811 and a server 838 associated with the institution 830 remains either inaccessible or indecipherable by third parties that may intercept such data.

Financial institutions 830, 840 and 850 may communicate with each other via a network 825. Network 825 may be a publicly accessed network such as 820. Alternatively, network 825 may have certain characteristics that differ from network 820, due to the different requirements of bank-to-bank communications. For example, certain security features and access restrictions may be more important in bank-to-bank communications.

In an embodiment, account owner 810 may wish to deposit a check that is drawn from payor account 870 at financial institution 850. Account owner 810 may deposit the check into customer account 860 by converting the check into electronic data, e.g., an image, and sending the data to financial institution 830. Various embodiments described herein may be carried out by financial institution 830 electronics such as server 838 upon receipt of a check image from computer 811. However, those of skill in computing and software technologies will appreciate that functionality can be distributed across a variety of devices and therefore some of the method steps, subsystems, and computer readable media may in some embodiments be located outside of the range of what would be considered financial institution 830 electronics, e.g., might be located at computer 811 or elsewhere in the network 820.

Account owner 810 may convert the check into a digital image by scanning the front and/or back of the check using image capture device 812. Account owner 810 may then send the image to financial institution 830. Sending the image may be referred to as "presenting" the check. Upon receipt of the image, financial institution 830 may credit the funds to account 860 in a "soft post" operation. In a soft post operation, the funds appear to be available for use by a customer, and may in fact be available for use, but at the very least some indication is retained to note that the funds have not actually been received from the payor bank. When the funds are received from the payor bank, the "soft post" is converted to a "hard post" and the indication is removed, along with any further restriction on the use of the funds. Financial institution 830 may clear the check by presenting the digital image to an intermediary bank, such as a regional branch of the Federal Reserve, a correspondent bank and/or a clearinghouse bank.

For example, the check may be cleared by presenting the digital image to financial institution 840, which may be a regional branch of the Federal Reserve, along with a request for payment. Financial institution 830 and 850 may have accounts at the regional branch of the Federal Reserve. As will be discussed in greater detail below, financial institution 830 may create a substitute check using the image provided by account owner 810 and present the substitute check to financial institution 840 for further processing. Upon receiving the substitute check, financial institution 840 may identify financial institution 850 as the paying bank (e.g., the bank from which the check is drawn). This may be accomplished using a nine-digit routing number located on the bottom left hand corner of the check. A unique routing number is typically assigned to every financial institution in the United States. Financial institution 840 may present the substitute check to financial institution 850 and request that the check be paid. If financial institution 850 verifies the check (i.e., agrees to honor the check), financial institution 840 may then settle the check by debiting funds from financial institution 850 and crediting funds to financial institution 830. Financial institution 850 may then debit funds from account 870.

It will be appreciated that the preceding examples are for purposes of illustration and explanation only, and that an embodiment is not limited to such examples. For example, financial institution 850 may be a correspondent bank (i.e., engaged in a partnership with financial institution 830). Thus, financial institution 830 may bypass the regional branch of the Federal Reserve and clear the check directly with financial institution 850. In addition, account 860 and account 870 may both be held at financial institution 830, in which case the check may be cleared internally.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A processor-implemented method for detecting a signature, comprising:
   a processor configured for:
   accessing a check image;
   sampling a plurality of areas in the check image;
   dynamically setting a maximum pixel count threshold based on the sampling of the plurality of areas in the check image;
   counting a number of dark pixels in a signature window of the check image to generate a signature window pixel count;
   comparing the signature window pixel count to the maximum pixel count threshold; and
   determining a potential signature error based on when the signature window pixel count is greater than the maximum pixel count threshold.

2. The method of claim 1, further comprising determining a signature window location in the check image.

3. The method of claim 2, wherein the signature window location is determined by:
   identifying a location of at least one feature in the check image; and
   selecting the signature window location based on the location of the at least one feature.

4. The method of claim 3, wherein the at least one feature comprises a text feature.

5. The method of claim 3, wherein the at least one feature comprises a graphical feature.

6. The method of claim 5, wherein identifying the location of at least one feature in the check image comprises identifying a line feature in the check image.

7. The method of claim 1, further comprising comparing the signature window pixel count to a minimum pixel threshold; and
   wherein the potential signature error is determined when the signature window pixel count is less than the minimum pixel threshold.

8. A system for detecting a signature on a check, comprising:
   a memory configured to store a check image; and
   a processor in communication with the memory and configured to:
   sample a plurality of areas in the check image;
   dynamically set a maximum pixel count threshold based on the sampling of the plurality of areas in the check image;
   count a number of dark pixels in a signature window of the check image to generate a signature window pixel count;
   compare the signature window pixel count to the maximum pixel count threshold; and
   determine a potential signature error when the signature window pixel count is greater than the maximum pixel count threshold.

9. The system of claim 8, wherein the processor is further configured to determine a signature window location in the check image.

10. The system of claim 9, wherein the processor is configured to determine the signature window location by:
    identifying a location of at least one feature in the check image; and
    selecting the signature window location based on the location of the at least one feature.

11. The system of claim 10, wherein the at least one feature comprises a text feature.

12. The system of claim 10, wherein the at least one feature comprises a graphical feature.

13. The system of claim 12, wherein the processor is configured to identify the location of at least one feature in the check image by identifying a line feature in the check image.

14. The system of claim 8, wherein the processor is further configured to compare the signature window pixel count to a minimum pixel threshold; and
    wherein the processor is configured to determine the potential signature error when the signature window pixel count is less than the minimum pixel threshold.

15. A non-transitory computer readable medium having computer-executable instructions for detecting a signature on a check, comprising:
    instructions for accessing a check image;
    instructions for sampling a plurality of areas in the check image;
    instructions for dynamically setting a maximum pixel count threshold based on the sampling of the plurality of areas in the check image;
    instructions for counting a number of dark pixels in a signature window of the check image to generate a signature window pixel count t;
    instructions for comparing the signature window pixel count to the maximum pixel count threshold; and
    instructions for determining a potential signature error when the signature window pixel count is greater than the maximum pixel count threshold.

16. The non-transitory computer readable medium of claim 15, further comprising instructions for determining a signature window location in the check image.

17. The non-transitory computer readable medium of claim 16, wherein the instructions for determining the signature window location comprise:
    instructions for identifying a location of at least one feature in the check image; and
    instructions for selecting the signature window location based on the location of the at least one feature.

18. The non-transitory computer readable medium of claim 17, wherein the at least one feature comprises a text feature.

19. The non-transitory computer readable medium of claim 17, wherein the at least one feature comprises a graphical feature.

20. The non-transitory computer readable medium of claim 19, wherein the instructions for identifying the location of at least one feature in the check image comprise instructions for identifying a line feature in the check image.

21. The non-transitory computer readable medium of claim 15, further comprising instructions for comparing the signature window pixel count to a minimum pixel threshold; and
    wherein instructions for determining the potential signature error further include instructions for determining the potential signature error when the signature window pixel count is less than the minimum pixel threshold.

* * * * *

UNITED STATES PATENT AND TRADEMARK OFFICE
CERTIFICATE OF CORRECTION

| | |
|---|---|
| PATENT NO. | : 9,058,512 B1 |
| APPLICATION NO. | : 11/864569 |
| DATED | : June 16, 2015 |
| INVENTOR(S) | : Reynaldo Medina, III |

It is certified that error appears in the above-identified patent and that said Letters Patent is hereby corrected as shown below:

In the Claims

In column 17, claim 1, line 23, after "potential signature error" delete "based on".

Signed and Sealed this
Twenty-sixth Day of April, 2016

Michelle K. Lee
*Director of the United States Patent and Trademark Office*